3,071,619
PREPARATION OF SECONDARY ARYL AMINES
Henry J. Kehe, Akron, and Roger T. Johnson, William J. Driscoll, and Robert R. Bloor, Lorain, Ohio, assignors to The B. F. Goodrich Company, New York, N.Y., a corporation of New York
Filed June 9, 1959, Ser. No. 819,108
8 Claims. (Cl. 260—576)

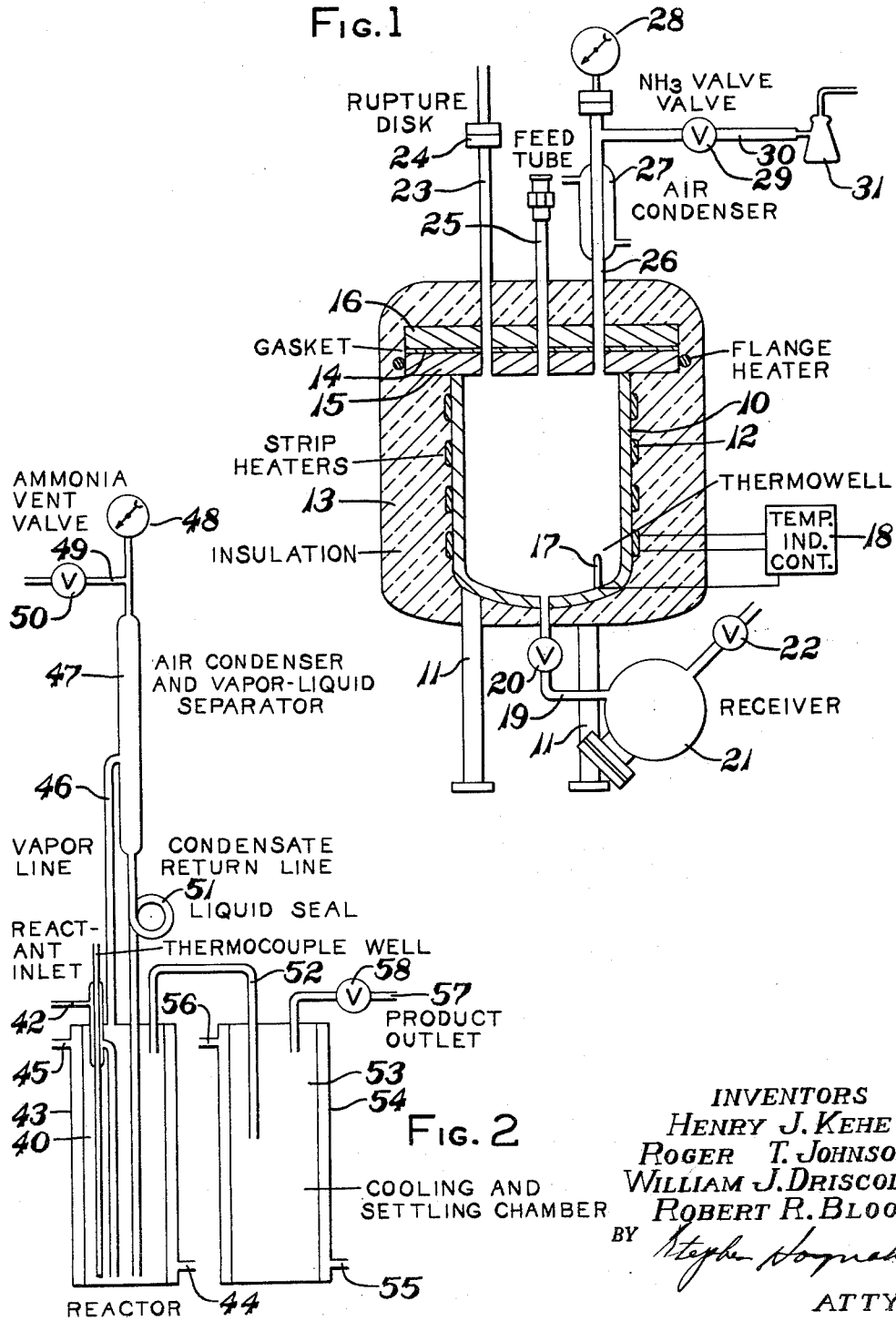

This invention relates to a method for preparing secondary aryl amines from primary aryl amines and more particularly pertains to a method for preparing secondary aryl amines of the benzene series by reacting primary amines of the series in liquid phase at elevated temperatures in the presence of a catalyst containing boron and fluorine atoms.

Secondary aryl amines of the benzene series are useful as raw materials for making antioxidants, as stabilizers for explosives and as dye intermediates. Thus, for example, when diphenylamine is melted with elemental sulfur it is converted to thiodiphenylamine (phenothiazine), which is the parent substance of thiazine dyes. Acridine can be prepared by reacting diphenylamine with formic acid in the presence of zinc chloride.

All catalysts heretofore used for preparing secondary aryl amines are highly corrosive to equipment made of ferrous metal, including stainless steel. These catalysts includes such compounds as $HCl$, $NH_4Cl$, $NH_4Br$, $FeCl_3$, $ZnCl_2$ and $AlCl_3$. In addition, the above catalysts effect considerable side reaction as evidenced by comparatively large amounts of tar formation and the catalyst, once used, cannot be recovered readily from the reaction mixture, so that on separation of the secondary amines the catalyst exerted additional deleterious effects.

Contrary to expectations $NH_4F$ exerts substantially no catalytic action on the reaction and alkali metal fluoborates are also inactive.

We have found, surprisingly, that $NH_4BF_4$ and $BF_3$ or $BF_3$ containing compounds or complexes which are convertible to $NH_4BF_4$ at elevated temperatures of about 125 to about 450° C. in the presence of ammonia or primary amines will catalyze the conversion of aromatic primary amines of the benzene series to secondary aromatic amines, when the reaction is carried out in liquid phase at about 175–450° C. The catalyst in the finished reaction mixture is in crystalline form and represents about 80 to slightly more than 90% of that originally employed, so that the crude reaction mixture need only be filtered and the catalyst can be reused as is, or slightly less than 10 to 20% additional fresh catalyst can be added and very good yields of secondary aryl amines are obtained.

Referring to the drawings, FIG. 1 is a vertical section of an apparatus that can be employed for diarylamines by the batch process.

FIG. 2 represents a vertical section of an apparatus which can be employed for a continuous process of preparing the diarylamines.

Referring now to FIG. 1, the apparatus consists of a stainless steel reactor 10 mounted on supports 11. The reactor has a plurality of electrical heating elements, 12 surrounding its outer wall, and insulation 13 to minimize heat loss to the atmosphere. The chamber has a heat resistant gas-tight gasket 14 disposed between flanges 15, 16 of the reactor.

The reaction temperature is controlled by a thermocouple, disposed in thermowell 17, the thermocouple is connected by wires to a temperature indicator 18, which, in turn, is connected to an electrical system, such as a rheostat, for control of the flow of current through the heating elements.

At the bottom of the reactor is a drain line 19, having a valve 20. This line connects with receiver 21, having a valve 22.

Tube 23, having a rupture disc 24, communicates with the interior of the reactor.

A mixture of primary aryl amine and catalyst is fed into the reaction chamber through tube 25, which is connected to a source of supply (not shown) of the reactants. The temperature of the reaction mixture is raised to 275–450° C. and the pressure is permitted to build up in the reactor to keep the reaction mixture in a liquid state. Preferably, the mixture is agitated by a stirrer (not shown) during the reaction. Vapors from the reaction pass through line 26, which has attached to it a condenser 27. This can be either an air or liquid cooled condenser. Ordinarily an air condenser is adequate to cool the primary amine vapors, but, if desired, the condenser can be cooled with a warm liquid, such as hot water. A pressure gauge 28 connected to line 26 is useful for regulating the pressure conditions in the reactor to insure that the reaction mixture remains liquid. During the course of the reaction ammonia is split out and vaporized. The ammonia vapor pressure can be utilized to maintain the reaction mixture in a liquid state. It is desirable, but not essential, to remove the ammonia from the reaction system. For this purpose bleeding of ammonia without loss of amine can be effected by operating valve 29 on line 30, which is connected to line 26. A liquid trap 31 may be connected to line 30. After holding the reaction mixture for the requisite time at the desired temperature and pressure the hot mixture is permitted to flow into the receiver. On cooling the mixture to about 275° C. the catalyst is substantially crystallized therefrom. About 80–90% of the initial catalyst is insoluble in the diarylamine and the remaining 10–20% is either soluble or is lost in the process. The crude reaction mixture can then be filtered, the crystalline catalyst recovered and re-used in another batch of reactants, and the diarylamine can be purified, if so desired, by distilling off the unreacted primary amine, dissolving the secondary amine in a suitable solvent and crystallizing the so purified diarylamine.

The apparatus of FIG. 1 can also be employed for continuous operation if the feed and withdrawal of product is each regulated so as to maintain the reactants under pressure for sufficient time to convert the primary aryl amine to a secondary diarylamine.

A modified form of apparatus for continuous operation is shown in FIG. 2. The primary aromatic amine and catalyst mixture is fed into reactor 40 through tube 42. The tube extends close to the bottom of the reactor. The reactor has a jacket 43 with an inlet 44 and outlet 45 for entry and exit, respectively, of a hot circulating fluid, which may be liquid or gaseous, to maintain the temperature of the reaction mixture in the proper range. Vapors from the reaction pass through tube 46 into air condenser 47. A pressure gauge 48 is attached to the top of the air condenser and a laterally extending line 49, with a valve 50 is also connected to the condenser. This valve serves to maintain the pressure at the proper level and also to vent ammonia which is formed during the reaction. The return tube 51 from the condenser extends almost to the bottom of the reactor and has a convolute turn which serves as a liquid seal. At the reaction temperature the catalyst is essentially in solution so that stirring is not necessary, but the mixture can be stirred if desired to insure maximum contact between catalyst and primary amine. With this construction, the unreacted primary amine initially entering the reaction zone and the condensed vapors both enter the heated zone near the bottom of the reactor, so that time and contact with catalyst is at a maximum. As the amount of reactants builds up in this reactor it will completely fill it and overflow through tube 52 into a cooling chamber 53. This cooling chamber has a jacket 54 together with an inlet 55 and outlet 56 for circulating a cooling medium, if such is desirable. It is also desirable to stir the product in the cooling and settling chamber so that as this chamber fills up the cooled product will be taken off through tube 57 which has a valve 58 for controlling the outlet rate. In place of the construction shown, it is also possible to have the bottom of the cooling chamber in the form of an inverted cone having an outlet valve. In such event it would be unnecessary to stir the cooled product since the catatlyst in crystalline form can be drained from the bottom of the cooling chamber, filtered and returned to the reactor. The fitrate can be subjected to distillation to separate the unreacted primary amine which is returned to the reactor.

The amount of catalyst employed can vary quite widely. Good results have been obtained with molar ration of aniline to catalyst from about 160:1 to about 10:1, but for economic reasons it is most desirable to use ratios of about 40–80 moles of aniline for each mole of catalyst.

Representative primary amines which can be reacted include aniline and mono- or polyloweralkyl substituted anilines, representative members of which are ortho-toluidine, meta-toluidine, para-toluidine, 2-ethyl aniline, 3-ethyl aniline, 4-ethyl aniline, 2,3-dimethyl aniline, 2,4-dimethyl aniline, 2,5-dimethyl aniline and 2,6-dimethyl aniline, 3,4-dimethyl aniline, and 3,5-dimethyl aniline. Halogenated amines, such as mono-, di- and trichloroanilines, ring halogenated mono-, di- and trichlorotoluidines, ring halogenated xylidines and ring halogenated ethyl benzene can also be used. Mixtures of primary amines can also be reacted to form secondary aryl amines.

The venting of ammonia is not absolutely essential for obtaining good results, but removal of the ammonia aids in shifting the reaction towards the desired direction, because it is known that ammonia slows down the formation of the secondary amines.

The catalyst can be added as $BF_3$, as a complex of $BF_3$, such as an etherate, ammonia $BF_3$ complex, or amine $BF_3$ complex or it can be added in any form which is convertible to $NH_4BF_4$ under reaction conditions. It can also be added as ammonium fluoborate. In fact, any boron trifluoride containing compound which is convertible to amomnium fluoborate under the reaction conditions herein described is satisfactory for catalytic purposes. It is preferred, however, to add the catalyst as ammonium fluoborate.

In the following examples the parts are given by weight unless otherwise specified.

EXAMPLE I

A series of runs were made using aniline and $NH_4BF_4$ for the production of diphenylamine. The time, temperature and catalyst ratios were varied. In making these runs the aniline and catalyst were charged to an autoclave. The mixture was heated and the autoclave was vented manually each ½ to 1 hour to remove excess ammonia. The vent gases were passed through a reflux condenser to separate aniline and diphenylamine out of the ammonia vapor. After completion of the reaction the mixture was passed into another pressure vessel and cooled rapidly. A mixture of aniline and diphenylamine was distilled at 3–5 mm. Hg. Unreacted aniline was stripped from the mixture and the diphenylamine was recovered by distillation at 100–120° C. and 0.5–1 mm. pressure. The small amount of residue was a tar. In all these runs $NH_4BF_4$ was the catalyst. The table below contains the results of the several runs.

| Run | Aniline | Catalyst | Ratio, amine/catalyst | Temp., °C. | Time, hrs. | Percent conversion of aniline | Percent yield diphenylamine |
|---|---|---|---|---|---|---|---|
| 1 | 930 | 13.1 | 80:1 | 350 | 3 | 43.1 | 97.1 |
| 2 | 930 | 26.2 | 40:1 | 350 | 3 | 33.5 | 97.0 |
| 3 | 930 | 13.1 | 80:1 | 330 | 3 | 29.4 | 94.0 |
| 4 | 930 | 13.1 | 80:1 | 370 | 3 | 46.0 | 94.6 |
| 5 | 930 | 6.6 | 160:1 | 350 | 3 | 24.8 | 96.7 |
| 6 | 930 | 13.1 | 80:1 | 350 | 6 | 50.3 | 93.9 |
| 7 | 930 | 13.1 | 80:1 | 360 | 2 | 33.8 | 96.7 |

The insoluble residue from run 7 was filtered from the reaction mixture and charged back to another batch of 930 parts aniline, and 2.6 parts of fresh $NH_4BF_4$. This weight of $NH_4BF_4$ amounts to 20% of the 80:1 ratio used in the above example. This procedure of recovering catalyst, adding 20% fresh catalyst and charging to a new batch was repeated ten times. In the tenth charge so made the aniline converted to diphenylamine was 42.6% and the yield was 94.4%. This latter reaction was run at 360° C. for 3.5 hours.

In another series, using $BF_3$ initially and as make up catalyst at 80% recovered catalyst and 20% fresh catalyst forty-eight batches of diphenylamine were made without encountering and difficulty. The aniline catalyst ratio was 40 to 1 and temperatures of 300–400° C. were employed. These batches were run both with and without venting of $NH_3$.

A mixture of 12.8 moles of aniline and 1 mole of $BF_3$ was reacted for 36 hours at a temperature of 183–5° C. at atmospheric pressure. Ammonia was vented from the reaction mixture as the reaction proceeded. The highest percentage of aniline converted was 5 and the yield of diphenylamine based on the aniline reacted was 57. 20% additional catalyst was added to a fresh batch of aniline in the same ratio as above. The reaction was then run for 36 hours at a temperature of 184–88- C. with venting of ammonia and at atominous pressure. The yields of diphenylamine were substantially the same as that described above.

EXAMPLE II

Good yields are obtained when the reaction mixture is run at a higher temperature even though the aniline catalyst ratio is somewhat lower. Thus, a reaction mixture made from about 28.6 mole of aniline per mole of $BF_3$ was run at 275–290° C. for 5 hours at a pressure of 130 to 140 pounds per square inch. Ammonia was periodically vented from the system. The yield of the diphenylamine based on the reactant aniline was 84.2% and the percent conversion to diphenylamine was 12.5%.

EXAMPLE III

When the proportions of reactants used in Example II are employed and the temperature is raised through about 325–350° C. at a pressure of 260–75 pounds per square inch with venting of ammonia the percent conversion to diphenylamine is 48.4% and the yield is 88.5%.

EXAMPLE IV

To the catalyst recovered from the run in Example III was added 20% additional $BF_3$ in mole ratio of one mole of catalyst per 28.6 moles of aniline. The reaction was run for 5 hours at a temperature of 325–50° C. and a pressure of about 275 to 300 pounds per square inch with venting of ammonia. The percent conversion in this run was 28.1. The diphenylamine yield was close to 100%.

EXAMPLE V

A mixture containing a molar ratio of 28.6 moles of aniline per mole of $BF_3$ was run for one hour at a temperature of 400 to 410° C. at a pressure of 400 to 450 pounds per square inch with venting of ammonia. The percent conversion was 43.2 and the diphenylamine yield was 84.0%.

EXAMPLE VI

A $BF_3 \cdot NH_3$ complex in a mole ratio of 1 per 28.6 moles of aniline was heated to 400–410° C. at a pressure of 600–700 pounds per square inch for one hour. Under these conditions the $BF_3 \cdot NH_3$ complex is converted to ammonium fluoborate. Ammonia was vented periodically during this period. Percent conversion to diphenylamine was 18.0 and the diphenylamine yield was 76.6. In an identical reaction with the exception that the pressure was reduced to 550 pounds per square inch the diphenylamine conversion was 28 and the yield was 87.4.

EXAMPLE VII

A mixture of aniline and $BF_3$ in a molar ratio of 40:1 was reacted for one hour at 400° C. at a pressure of 740 pounds per square inch. During this reaction ammonia was not vented. The percent conversion to diphenylamine was 22.0 and the percent yield on the ammonia reacted was 90.5.

EXAMPLE VIII

A mixture of aniline and $BF_3$ in a mole ratio of 80 to 1 was reacted for 2 hours at a temperature of 400–20° C. at a pressure of 350–500 pounds per square inch. Ammonia was vented during this run. Percent conversion to diphenylamine was 22.3 and the percent yield based on the aniline reacted was 74.5%.

EXAMPLE IX

Aniline was blended with a $BF_3 \cdot NH_3$ complex in a mole ratio of 40 to 1. This was heated to 400 to 415° C. and the reaction was run for one hour at 600 to 700 pounds per square inch with venting of ammonia. The percent conversion to ammonia was 38.3 and the yield based on the aniline reacted was 89.2.

EXAMPLE X

A series of batch runs was made at 350° C., except as otherwise indicated, with an aniline to catalyst ratio of 40 to 1. Ammonium fluoborate was the catalyst. The reaction period was 3 hours. The ammonia was vented during the reaction period. After each run the reaction mixture was filtered, the catalyst was recovered, 20% new catalyst was added and the run repeated under substantially the same conditions. The table below shows the results obtained in these tests.

*Table A*

| No. of runs | Conversion, percent | Yield, percent | Weight cat. res., gms. |
| --- | --- | --- | --- |
| 1 | 45.9 | 95.8 | |
| 2 | 48.2 | 95.6 | 23 |
| 3 | 47.9 | 95.2 | 22.5 |
| 4 | 49.7 | 94.5 | 27.5 |
| 5 | 48.0 | 95.8 | 29.9 |

In another series of tests the reaction conditions were substantially identical except that only 10% new catalyst was added per run. The results obtained are shown in Table B below.

*Table B*

| No. or runs | Conversion, percent | Yield, percent | Weight cat. res., gms. |
| --- | --- | --- | --- |
| 1 | 37.9 | 95.5 | |
| 2 | 46.4 | 94.9 | 20.4 |
| 3 | 49.5 | 95.0 | 25.4 |
| 4 | 48.7 | 95.7 | 23.2 |
| 5 | 41.2 | 94.8 | ¹ 27.0 |
| 6 | 44.1 | 96.1 | 38.0 |
| 7 | 43.9 | 96.8 | 37.0 |
| 8 | 26.9 | 98.5 | |
| 9 | 39.1 | 97.4 | 20.2 |
| 10 | 44.4 | 96.4 | 26.9 |
| 11 | 43.5 | 95.9 | 32.1 |
| 12 | 44.9 | 95.6 | ² 32.3 |
| 13 | 45.1 | 95.6 | 24.4 |
| 14 | 45.1 | 95.2 | 29.9 |
| 15 | 47.3 | 95.6 | 34.2 |
| 16 | 42.9 | 94.7 | |
| 17 | 44.9 | 94.6 | 31.7 |
| 18 | 46.0 | 94.2 | 31.9 |

¹ Switched to 335° C.

² Started using 55% recycle 

It is apparent that continued reuse of the catalyst with only very small amounts of make up does not affect its activity.

EXAMPLE XI

A mixture of aniline and $BF_3$ at a mole ratio of 160 to 1 was prepared. This was heated to 400° C. and held at this temperature for 1 hour. Ammonia was not vented during this reaction period. Percent conversion to diphenylamine was 24.6% and the yield on the aniline reacting was 96.5.

EXAMPLE XII

In a continuous process a mixture containing a 40 to 1 mole ratio of aniline-$BF_3$ was passed through a reactor over a period of one hour at a temperature of 400° C. at a pressure of 600 to 750 pounds per square inch. Ammonia was not vented in this run. The percent conversion to diphenylamine is 18.0. In another run using the same proportion of reactants and catalyst for the same time, but lowering the pressure to 400–500° C. and venting of ammonia the percent conversion of aniline to diphenylamine was about 20.5. In each case the catalyst could be removed from the reaction mixture by filtration and returned to the reactor without loss of catalytic activity.

EXAMPLE XIII

A mixture of para-toluidine and ammonium fluoborate in a mole ratio of 40 to 1 was reacted for 3 hours at 330° C. After running this reaction for 2 hours the system was vented and found to contain ammonia. No additional venting was carried on during the remainder of the run. The percent conversion of para-toluidine was 17.6 and the percent yield of di(methylphenyl)amine based on the toluidine reactant was 67.8.

EXAMPLE XIV

A mixture of xylidines containing 2,3-, 2,4-, 2,5-, 2,6-dimethyl 3,4- and 3,5-aniline and sufficient ammonium fluoborate to provide a mole ratio of amine to catalyst of from 40 to 1 was prepared and reacted at a temperature of 335° C. for 3 hours. The system was vented after 2 hours and the vapors were found to contain ammonia. After completion of the reaction the mixture was distilled at 94 to 98° C. at 6 millimeters. At this temperature the diaryl amines seemed to breakdown. However, there remained a small amount of a yellow liquid which was a mixture of diaryl amines that could not be separated with ease.

EXAMPLE XV

Four runs were made at 350° C. over a 3 hour period using aniline as the amine in a 40 to 1 aniline catalyst ratio. In one group of two runs $NH_4BF_4$ was the catalyst. This was recovered at the end of the operation and 20% fresh catalyst was added to another batch of aniline and the same reaction conditions as those above were followed. This same procedure of recovering catalyst was also used with two runs using $BF_3$ as a catalyst under conditions described above, with 20% addition of fresh catalyst in the second run.

The results of these tests are shown below:

| Catalyst | Run | Percent conversion | Percent yield diphenylamine |
|---|---|---|---|
| $NH_4BF_4$ | 1 | 45.9 | 95.8 |
| $NH_4BF_4$ | 2 | 48.2 | 95.6 |
| $BF_3$ | 1 | 47.0 | 93.2 |
| $BF_3$ | 2 | 48.4 | 93.7 |

When other complexes of $BF_3$, including etherates, but not limited thereto, are used as a catalyst in the reaction systems, the conversion of primary aryl amines to secondary aryl amines is effected, and substantially the same order of yields are obtained.

Also, other primary amines can be substituted in place of those described in the specific examples to prepare secondary aryl amine by the process of this invention.

The corrosion rates for $BF_3$ were also studied. 304 and 316 type stainless steels and carbon steel were subjected to $NH_4BF_4$ containing reaction mixture, liquid and vapor, at temperatures up to 350° C. for a period of slightly more than 172 hours during several batch runs. 304 stainless steel in the liquid $NH_4BF_4$ showed a corrosion rate of .0011 inch per year. In the vapor phase the corrosion rate was .0125 inch per year. With 316 stainless steel the liquid corrosion rate was .0010 inch per year and the vapor phase corrosion rate was .0069 inch per year. Carbon steel showed a corrosion rate of .0001 inch per year when subjected to liquid $NH_4BF_4$ and .0043 inch per year when subjected to the vapor phase. These corrosion rates are considerably lower than those of ammonia chloride, ammonia bromide, aluminum chloride, zinc chloride or ferric chloride. Therefore, it makes possible the construction of reaction equipment, readily available materials, does not require exceptional linings such as those necessary when the conversion of primary amines to secondary amines are effected by the highly corrosive catalysts.

We claim:

1. Method of preparing diphenylamine comprising heating aniline in the presence of boron fluoride as a catalyst under superatmospheric pressure.

2. A method for preparing diaryl amines of the benzene series comprising heating a primary amine from the class consisting of aniline and lower alkyl ring substituted aniline in the presence of a catalyst consisting of a $BF_3$ containing compound which is convertible to $NH_4BF_4$ under the reaction conditions specified, at a temperature of from about 175 to about 450° C., the mole ratio of the catalyst to amine being from about 1 to 10 to about 1 to 160.

3. A method of preparing diphenylamine comprising heating aniline in liquid phase in the presence of a $BF_3$ complex which is convertible to $NH_4BF_4$ under the reaction conditions specified at a temperature of from about 175 to about 450° C. the mole ratio catalyst to amine being from about 1 to 20 to about 1 to 120.

4. The method of claim 3 in which the catalyst is $BF_3$.

5. The method of claim 3 in which the catalyst is $BF_3$ and aniline is the amine.

6. The method of claim 3 in which the catalyst is $BF_3$ etherate.

7. The method of claim 3 in which the catalyst is ammonium fluoborate.

8. A method for preparing diphenylamine comprising heating aniline in liquid phase in the presence of ammonium fluoborate at a temperature of from about 300 to 350° C., the mole ratio of catalyst to amine being from about 1 to 40 to 1 to 80.

References Cited in the file of this patent

UNITED STATES PATENTS

| | | |
|---|---|---|
| 2,225,368 | Craig | Dec. 17, 1940 |
| 2,391,139 | Dickey et al. | Dec. 18, 1945 |
| 2,656,389 | Johannesen | Oct. 20, 1953 |
| 2,834,799 | Sowa | May 13, 1958 |

UNITED STATES PATENT OFFICE
CERTIFICATE OF CORRECTION

Patent No. 3,071,619                      January 1, 1963

Henry J. Kehe et al.

It is hereby certified that error appears in the above numbered patent requiring correction and that the said Letters Patent should read as corrected below.

Column 1, line 28, for "includes" read -- include --; column 3, line 34, for "ration" read -- ratios --; column 4, line 37, for "and" read -- any --; line 50, for "184-88-C." read -- 184-88° C. --; column 6, line 67, for "trom" read -- from --.

Signed and sealed this 23rd day of July 1963.

(SEAL)
Attest:

ERNEST W. SWIDER
Attesting Officer

DAVID L. LADD
Commissioner of Patents